United States Patent [19]
Lim et al.

[11] Patent Number: 5,553,101
[45] Date of Patent: Sep. 3, 1996

[54] DEMODULATION LOGIC UNIT ADAPTABLE TO MULTIPLE DATA PROTOCOLS

[75] Inventors: Ricardo Lim, Richmond; Marek Dutkiewicz, Delta, both of Canada

[73] Assignee: Motorola, Schaumburg, Ill.

[21] Appl. No.: 543,353

[22] Filed: Oct. 16, 1995

Related U.S. Application Data

[63] Continuation of Ser. No. 144,929, Oct. 28, 1993, abandoned.

[51] Int. Cl.$^6$ ..................................................... H03D 1/00
[52] U.S. Cl. ........................... 375/340; 375/216; 375/220; 375/346; 395/831; 395/834; 395/883; 371/30; 329/372
[58] Field of Search ................................. 375/216, 219, 375/220, 222, 223, 273, 323, 340, 346, 377; 455/334, 337, 340; 371/30; 395/831, 834, 883, 285, 286; 348/554, 555; 364/180, 737; 329/372

[56] References Cited

U.S. PATENT DOCUMENTS

| | | | |
|---|---|---|---|
| 4,425,665 | 1/1984 | Stauffer | 375/223 |
| 4,852,127 | 7/1989 | Fraser et al. | 375/94 |
| 5,058,138 | 10/1991 | Figura et al. | 375/97 |
| 5,099,500 | 3/1992 | Furlong | 375/94 |
| 5,220,584 | 6/1993 | Burns | 375/97 |
| 5,233,627 | 8/1993 | Kozima et al. | 375/98 X |
| 5,270,666 | 12/1993 | Rapeli et al. | 329/341 |
| 5,315,619 | 5/1994 | Bhatt | 375/94 |
| 5,363,408 | 11/1994 | Paik et al. | 375/39 |

*Primary Examiner*—Stephen Chin
*Assistant Examiner*—Amanda T. Le
*Attorney, Agent, or Firm*—Charles W. Bethards; Kevin A. Buford

[57] ABSTRACT

A data demodulation logic unit (200) and method used therein, adaptable to multiple data protocols, including an arithmetic logic unit (205) that is architecturally optimized to demodulate multiple data protocols under the control of a hardware based state machine (209) that operates in a selectable mode that corresponds to one of multiple data protocols.

16 Claims, 2 Drawing Sheets

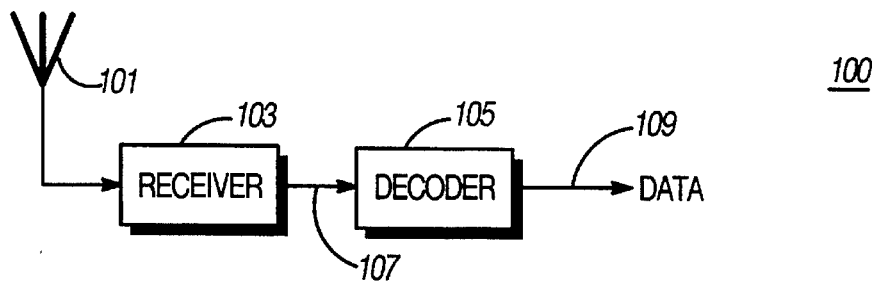
FIG.1
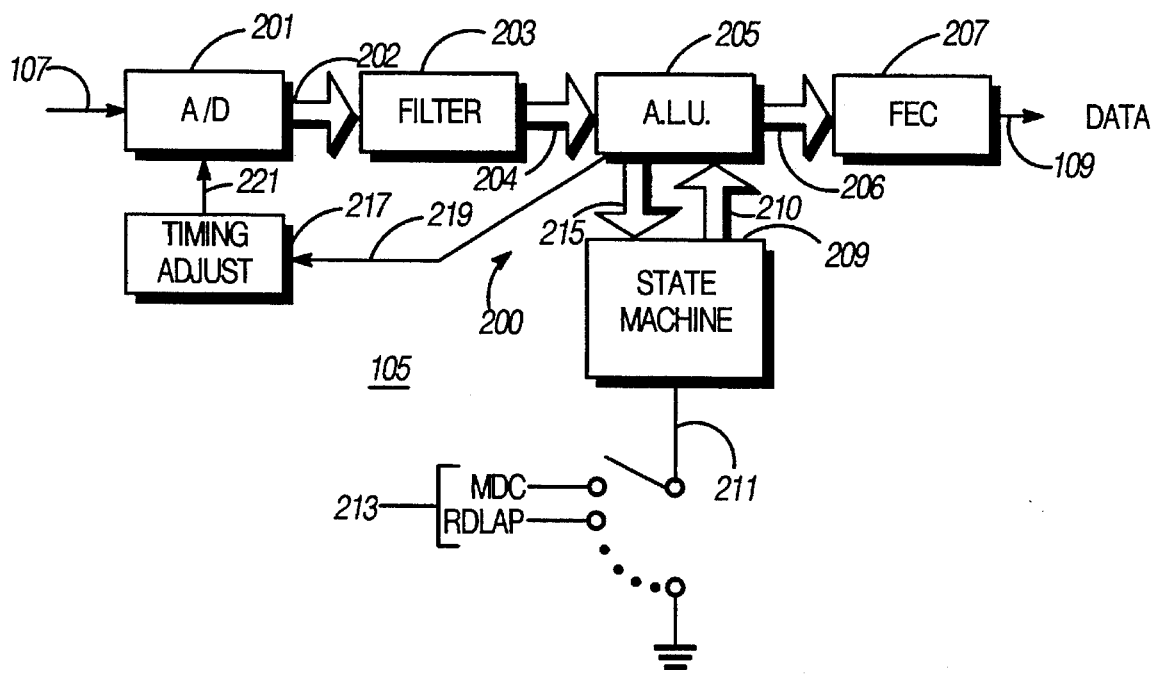
FIG.2
| REGISTER NAMES | MDC VARIABLE | RDLAP VARIABLE |
|---|---|---|
| A1REG | SIGAVG | - |
| A2REG | ONEAVG | AVGSYM ERR. |
| A3REG | ZEROAVG | SOFTDEC |
| A4REG | DCAVG | DCOFFST |
| A5REG | POS ZEROX | PREVXIN |
| A6REG | ZEROX | SYMDIFF |
| A7REG | TIMERROR | TIMERROR |
| B1REG | NEGZEROX | SYMERR |
FIG.4

DEMODULATION LOGIC UNIT ADAPTABLE TO MULTIPLE DATA PROTOCOLS

This is a continuation of application Ser. No. 08/144,929, filed Oct. 28, 1993 and now abandoned.

FIELD OF THE INVENTION

This disclosure deals generally with data demodulators and more specifically, but not limited to, data demodulators which are adaptable for demodulation of multiple data modulation protocols.

BACKGROUND OF THE INVENTION

Many current data demodulators implement the demodulation function, associated with a specific modulation scheme such as Motorola Radio Data Link Access Procedure (RDLAP) or Motorola Mobile Data Communications protocol (MDC), using a general purpose processor, such as a digital signal processor (DSP), executing a software controlled demodulation algorithm. Such processors, in particular DSPs are very flexible in that different data demodulators may be readily accomplished by changing a software algorithm. However, DSPs are relatively power-hungry and therefore may not be suitable or optimum for use in or as data demodulators intended for portable products where battery life is a concern. Such demodulators ordinarily seek to minimize power consumption and thus prolong battery life. Additionally the cost and physical space typically required for the DSP and associated memory for software is often contradictory to the objectives of a data demodulator for portable applications.

There are existing land-line data modem integrated circuits that effect a demodulation algorithm for a land-line or hardwired data modulation protocol. There are also modem integrated circuits which implement demodulation algorithms, such as RDLAP or MDC, for wireless data modulation protocols. Such modem integrated circuits can be arranged and constructed to have power consumption characteristics and physical space requirements that are advantageous for a portable product requiring demodulation capability for a sole data modulation protocol. However as alluded to above this approach has the disadvantages of being relatively inflexible if a different data modulation algorithm is desired. Furthermore, this approach is not feasible, or at least not practical, for addressing the wireless data market's needs to the extent that capability to effect multiple data modulation protocols is required.

Clearly an urgent need exists for a data demodulation logic unit that is adaptable to multiple data modulation protocols and satisfies the power consumption and space requirements of a portable product.

BRIEF DESCRIPTION OF THE DRAWINGS

The features of the present invention which are believed to be novel are set forth with particularity in the appended claims. However, the invention together with further advantages thereof, may best be understood by reference to the accompanying drawings in which:

FIG. 1 is a block diagram of a data receiver in accordance with a preferred embodiment of the instant invention.

FIG. 2 is a block diagram of a data decoder in accordance with a preferred embodiment of the instant invention.

FIG. 4 is a table of variables for two different data protocols that may be used with the FIG. 3 arithmetic logic unit.

DETAILED DESCRIPTION OF A PREFERRED EMBODIMENT

Figure 3:
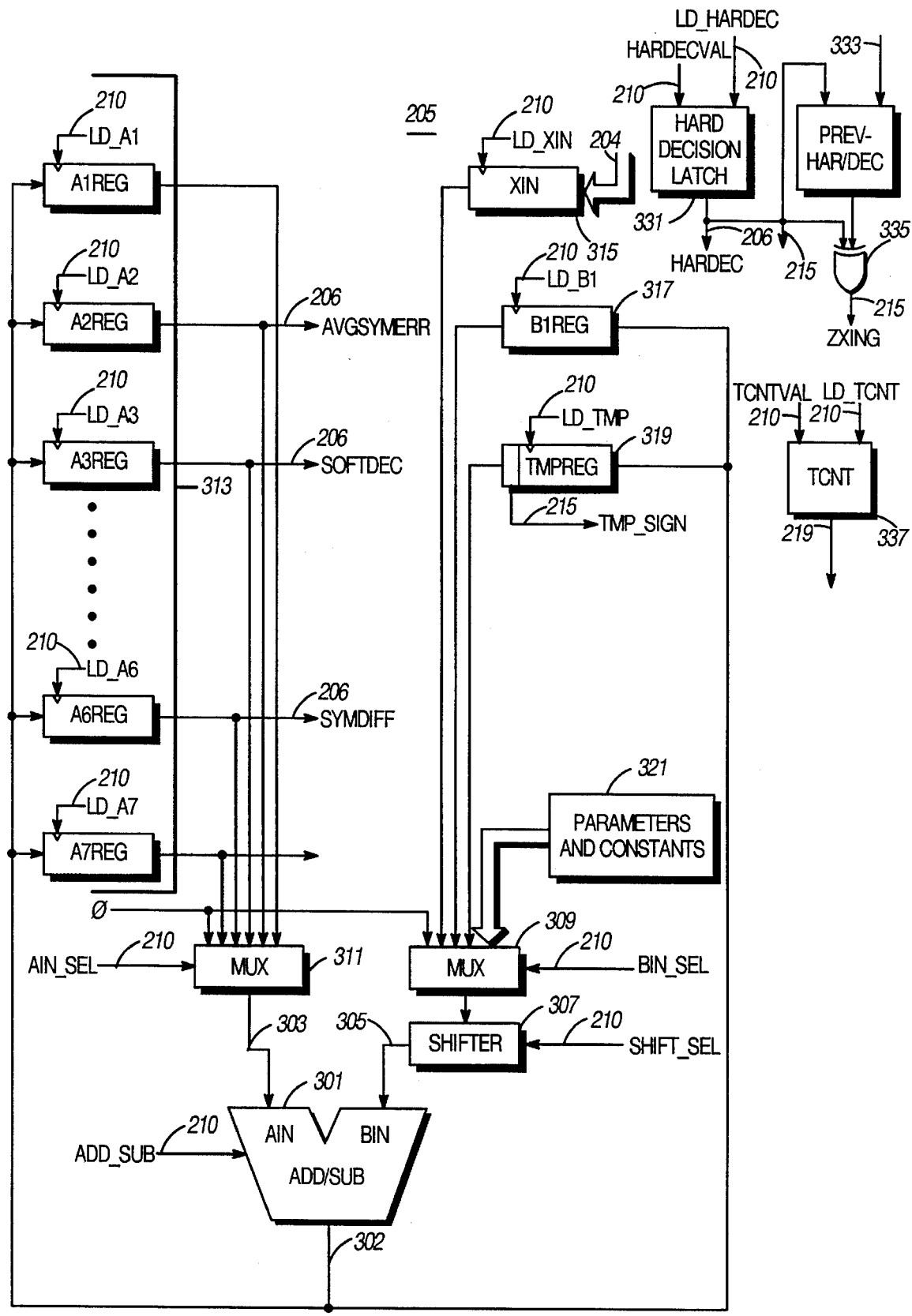
FIG. 3 is a functional diagram of the arithmetic logic unit portion of the FIG. 2 embodiment.

Generally this disclosure deals with a data demodulation logic unit that has improved power consumption and enhanced data demodulation capabilities. This data demodulation logic unit includes an arithmetic logic unit that has been architecturally optimized for data demodulation requirements and a hardware based state machine that is advantageously arranged to operate in a mode that selectively corresponds to one of a plurality of possible data modulation protocols.

The instant invention will be further explained by reference to the Figures, in which FIG. 1 is a data receiver (100). The data receiver (100) is coupled to an antenna (101) and is arranged and constructed to receive a radio frequency (RF) signal that includes data modulation in accordance with one of a plurality of data protocols. The data receiver (100) includes a receiver (103) coupled to a decoder (105) at a decoder input (107). The receiver (103) converts the RF signal to a base band signal at a decoder input (107) and the decoder (105) processes, as further explained below, this base band signal to provide data at an output (109).

The decoder (105), shown in FIG. 2 and preferably embodied in a semi-custom application specific integrated circuit (ASIC), includes an analog-to-digital (A/D) converter (201) which converts the base band signal at the decoder input (107) to sampled digital values or digital words at an output (202). A timing adjuster (217) controls the timing of the A/D converter (201) through a set of control signals (221) as indicated at an input (219). The sampled digital values (202) are coupled to and processed by a digital filter (203) which provides filtered sampled data. The filtered sampled data is coupled to an input (204) of a data demodulation logic unit (200).

The data demodulation logic unit (200) is the heart of the decoder (105) and the data receiver (100) and includes an arithmetic logic unit (ALU) (205) and a state machine (209). The ALU (205) includes an input, depicted as the input (204), an output (206), and a timing output coupled to the input (219) of the timing adjuster (217), and is controllably operable to convert a base band signal, specifically the filtered base band signal, at the input (204) to a demodulated data signal at the output (206). The ALU (205) is coupled to the input (204) and is controlled by the state machine (209) at an interface (210). The state machine (209) is embodied in electronic hardware and operates in a mode that selectively corresponds to a data protocol to control the ALU (205).

The state machine (209) provides this control conditioned, when required, on an output (215) from the ALU (205). The data demodulation logic unit (200) processes the filtered sampled data and provides the demodulated data signal or digital signal at an ALU output (206). The digital signal represents an estimate of the decoded data, or more generally symbols, and is coupled to a forward-error-correction (FEC) circuit (207). The FEC circuit (207) further processes the digital signal to produce data, specifically a demodulated and forward error corrected data bit stream, at the output (109). Preferably the FEC circuit (207) operates, in the case of the RDLAP data modulation protocol, as disclosed in co-pending application Ser No. 08/145,059 and titled A Computationally Efficient Data Decoder And Method Used Therein by Dutkiewicz having a like filing date and assigned to the same assignee as here.

The decoder (105), more specifically the data demodulation logic unit (200), adaptively operates in accordance with one of multiple data modulation protocols by virtue of a, functionally depicted, switch setting (211) that is coupled to the state machine (209). The state machine (209) operates in a mode to control the ALU (205) where this mode selectively corresponds to a data protocol, such as RDLAP, MDC, etc. as determined by a switch (213). In practice the switch in the preferred embodiment is a bit setting stored in a configuration register and made available to the state machine (209) as the switch setting (211).

Some general information, regarding the functions of the instant data demodulation logic unit (200), is required to provide a full appreciation of the preferred embodiment of the ALU (205) and the state machine (209). In general, demodulation algorithms for various data modulation protocols consist of control loops which track, for example a timing reference, an amplitude gain, and a DC offset of the received base band signal. These control loops often consist of first-order low-pass digital filters described in the form of the general equation shown below:

$$Y(n)=(1-k)*Y(n-1)+k*X(n) \qquad \text{Equation 1}$$

where $Y(n)$ is the current output for the current time period, $Y(n-1)$ is the previous output for the previous time period, and $X(n)$ is the current input. The equation shows that there are two multiplications involved in the calculation. In order to avoid multiplication operation, which usually takes significant circuit area to implement, the equation can be rewritten in the following equivalent form:

$$Y(n)=Y(n-1)-k*(Y(n-1)-X(n)) \qquad \text{Equation 2}$$

where there is only one multiplication involved. If powers of 2 can be used for the parameter k in the equation, then a barrel shifter, which is a simpler circuit and take up less area, can be used rather than a multiplier. The calculation steps can then be broken down into a subtraction ($tmp1=Y(n-1)-X(n)$), a shift of the difference ($tmp2=[k*tmp1]=[2^r*tmp1]$, shift left by r positions if r is positive, shift right by |r| positions if r is negative, and no shift if r=0), and another subtraction ($Y(n)=Y(n-1)-tmp2$).

The above simplified operations for implementing the low-pass digital filters are used as the basis for the architecture of a preferred embodiment of the instant invention as is further explained below.

With that overview, a preferred embodiment of the demodulator logic unit's (200) architecture and function is described as implemented to effect two or more demodulation algorithms using the ALU (205) and the state machine (209) as a controller unit. The ALU (205) in a preferred embodiment, for an MDC and RDLAP demodulator, shown in FIG. 3, includes an adder/subtractor (301), a shift register arranged as a barrel shift register or barrel shifter (307), two multiplexers (309 and 311) used to select sources for input to the adder/subtractor (301), a first plurality of registers (313) each having an input, an output, and a control input, a second plurality of registers (315, 317, 319), each having an input, an output, and a control input, a plurality of parameters and constants (321) to be used for various calculations by the respective demodulation algorithms, a hard decision latch (331) with control and data (P/O 210) inputs and an output (P/O 206 & 215), a latch to store previous hard decision (333), an exclusive-OR gate (335) for comparing HARDEC[0] and PREVHARDEC, and a timing count register with control and data inputs (P/O 210) and an output (219) which is used to feed back to the timing adjuster (217). The adder/subtractor unit has two data inputs, a AIN (303) and a BIN (305), respectively and selectively coupled to the first and second plurality of registers and a control input ADD_SUB (P/O interface 210). When a subtraction operation is selected the output (302) is equal to AIN - BIN. The AIN (303) input of the adder/subtractor has 8 sources of input, selectable by the multiplexer (311) using the AIN_SEL control input (P/O 210), including registers A1REG to A7REG (313) and the value 0. The "A" registers can be more or less than 7 for other data modulation protocols depending on the requirements for the demodulation algorithm. Variables that are mapped to or selectively stored in the "A" registers are ones that are not subtracted from any other variables or values in any of the equations for the demodulation algorithms. The BIN input (305) of the adder/subtractor also has several sources, selectable by the multiplexer (309) using the BIN_SEL control input (P/O 210), which can optionally be shifted fight by 0 to 7 positions through the shifter (307) under the control of the SHIFT_SEL (P/O 210). Variables that are selectively assigned or mapped to the BIN input of the adder/subtractor are those that are subtracted from other parameters or values in one or more of the equations that describe the demodulation algorithms. A XIN register (315) is used to store the filtered sampled base band data at the input (204) and it is used in subtraction operations so it is selectively assigned or mapped to the BIN input of the adder/subtractor (301). In MDC and RDLAP, there is only one variable that is mapped to the BIN input and so there is only a B1REG (317). However, for other protocols, there may be more than one variable that should be mapped to the BIN input and these protocols may require additional registers (B2REG, . . . , etc.). The TMPREG register (319) is used to hold temporary or intermediate values during a calculation of an equation. There are various other parameters and constants (321) in MDC and RDLAP that are not dynamically updated during the demodulation process. These parameters and constants (321) are also mapped to the BIN input (305).

Control interface (210) includes various control lines from the state machine (209) to the ALU (205). These control lines are used to control the loading of all the registers, the selection for the multiplexers, the number of positions to shift the BIN source, the operation of the adder/subtractor (301), the value to load to the hard decision latch (331), and the value to load to the TCNT latch (337). In each clock operation, one or more of the registers (except XIN) can be loaded with the output of the adder/subtractor unit (302). Transfers between registers can be accomplished by selecting the value 0 for one of the two inputs of the adder/subtractor, selecting a shift of 0, selecting the addition operation, selecting a source register as the appropriate multiplexer input, and clocking or enabling the destination register's LD_!! (P/O 210). One control output (TMP_SIGN (P/O 215), that indicates the sign (an algebraic positive or negative) of the contents of the register (TMPREG) (319), is a feed back signal to the state machine (209). Comparisons between the value of any two parameters or variables can be made (i.e. greater than, less than, or equal to) by transferring or loading one parameter to the TMPREG register, then subtracting TMPREG from the other parameter (mapped to the AIN input (303)), storing the result from the adder subtractor (301) at the output (302) in the TMPREG register (319), and then checking the TMP_SIGN output (P/O 215).

There are several outputs from the ALU (206) which are coupled at the output (206) to the forward-error-correction circuit (207) including the hard decision value, HARDEC, the soft decision value, SOFTDEC (A3REG), the average symbol error, AVGSYMERR (A2REG), and the amplitude difference between symbols, SYMDIFF (A6REG). HARDEC is used for both MDC and RDLAP operation of the forward-error-correction circuit while SOFTDEC, AVGSYMERR, and SYMDIFF are only used for RDLAP operation.

Each of the A1REG–A7REG and the B1REG registers (313 and 317) function differently between MDC and RDLAP mode. FIG. 4 shows the mapping of the registers for MDC and RDLAP variables.

The following pseudo-code fully discloses the demodulation algorithm for MDC that the state machine (209) implements when the MDC mode is selected at (213). This pseudo-code using the variables as defined describes, functionally, the operation of a hardware embodiment of the state machine (209). This pseudo code or more specifically the functions described by this code are performed by the hardware embodiment for each sampled filtered data at input (204). This hardware embodiment is preferably a semi-custom application specific integrated circuit available from Motorola Semiconductor Sector.

The procedure involved in translating the pseudo code into an ASIC embodiment of the state machine include an initial translation of the pseudo code into a equation level Verilog code using an ordinary text editor as is understood in the art. Verilog is a computer language, used in the industry, to describe hardware. The verilog language includes essentially two levels; one is equation based and one is a network list based. Given the equation level Verilog code a program called Synopsis is used to read this verilog code, select standard cells from a library of cells available from manufacturers such as Motorola, and translate the equation level Verilog code to a component network list Verilog code. This component network list is then converted into a layout and thus an ASIC mask set that may be used to provide the ASIC.

---

MDC Variables

XIN-register to hold input sampled data.
SIGAVG-running average of the received base band signal.
ONEAVG-running average of the "1" symbol.
ZEROAVG-running average of the "0" symbol.
DCAVG-running average of the DC offset of the received base band signal.
POSZEROX-zero-crossing level with positive slope.
NEGZEROX-zero-crossing level with negative slope.
ZEROX-zero-crossing level.
TIMERROR-running average of timing error.
HARDEC-hard decision.
PREVHARDEC-previous hard decision.
TCNT-counter to adjust timing of A/D converter.
Fk-coefficient for SIGAVG calculation.
Fa-coefficient for ONEAVG and ZEROAVG calculations.
Fc-coefficient for TIMERROR calculation.
Tth-timing error threshold.
SAMPCLK-sample clock-24 kHz. (400)
SYMCLK-symbol clock = SAMPCLK/5 – 4800. (403)
sampcnt-sample counter to count 5 SAMPCLKs per SYMCLK. (405)

Pseudo code for MDC

```
@ rising edges of SAMPCLK:
    if (sampcnt = 0) (407)
        sampcnt = 4
    else
        sampcnt = sampcnt + 1
    XIN = filter output (204 in FIG. 3). (409)
@ falling edges of SAMPCLK: (411)
    SIGAVG = SIGAVG – Fk(SIGAVG – XIN) (413)
    case (sampcnt) (415)
        =3:    XZERO = XIN (417)
        =2:    XZERO = (XIN + XZERO)/2 (419)
        =0:    begin (421)
               TCNT = 20 (423)
               PREVHARDEC = HARDEC[0] (425)
                   /*Hard decision*/
               if (XIN > DCAVG) (427)
                 HARDEC[0] = 1
               else
                 HARDEC[0] = 0
                   /*Zero crossing updates*/
               if (HARDEC[0] does not equal PREVHARDEC) (429)
                 if (HARDEC[0] = 1)
                   POSZEROX = XZERO
                 else
                   NEGZEROX = XZERO
                   /*Timing error calculation*/ (431)
                 TIMERROR = TIMERROR – Fc(TIMERROR – (POSZEROX – NEGZEROX))
               if (TIMERROR > Tth) (433)
                 begin (435)
```

```
                TIMERROR = TIMERROR - Tth
                TCNT = 19
            end
        else
        if (TIMERRROR < -Tth) (437)
            begin (439)
                TIMERROR = TIMERROR + Tth
                TCNT = 21
            end
            /*ONEAVG and ZEROAVG calculations*/
        if (HARDEC[0] = 1) (441)
            ONEAVG = ONEAVG - Fa(ONEAVG - XIN) (443)
        else
            ZEROAVG = ZEROAVG - Fa(ZEROAVG - XIN) (445)
            /*DC offset calculations*/
        if (demodulator is in Acquire more)
            DCAVG = SIGAVG (447)
        else
            DCAVG = (ONEAVG + ZEROAVG)/2 (449)
        end
    endcase
```

The following is an explanation of the functions performed by the preferred hardware embodiment of the state machine (209) to perform the MDC demodulation algorithm (per the above pseudo-code). In MDC, each symbol represents 1 bit of data and the symbol rate transmitted over the RF channel is 4800 symbols per second (403). A symbol is decoded as a '1' if it is greater than or equal to a certain DC offset value, which varies from radio to radio, and a '0' is decoded if the symbol level is less than the DC offset value.

The demodulation algorithm samples the received baseband signal at a rate (SAMPCLK, clock used for sampling) which is 5 times the symbol rate (5×4800 kHz=24 kHz). In the preferred embodiment of the invention, the baseband signal samples are clocked into the XIN (204) register of the ALU on the rising edges of SAMPCLK (409). Also on the rising edges of SAMPCLK, a counter, sampcnt (405), is decremented modulo 5 to count at which of the 5 samples per symbol the current sample is (407).

On the falling edges of SAMPCLK (411), the running average of the sampled baseband signal, SIGAVG, is calculated (413) as well as other calculations depending on what the value of sampcnt is (415). The operation (413) is implemented in the preferred embodiment by the following steps:

1) Select XIN, with shift of 0 through the barrel shifter (307), as the BIN input of the adder/subtracter unit, select A1REG (SIGAVG) as the AIN input of the adder/subtracter unit, select the subtract operation for the adder/subtracter, and enable the LD_TMP control input of TMPREG to load the result (output) of the adder/subtracter into TMPREG (TMPREG=SIGAVG−XIN).

2) Select A1REG (SIGAVG) as the AIN input of the adder/subtracter, select the TMPREG, with shift right of r through the shifter (307) to perform multiplication by Fk=½$^r$, as the BIN input of the adder/subtracter, select the subtract operation for the adder/subtracter, and enable the LD_A1 control input of A1REG (SIGAVG) to load the result (output) of the adder/subtracter into A1REG (SIGAVG=SIGAVG−TMPREG * (½$^r$)).

On the falling edges of SAMPCLK (411), if sampcnt equals 3, the XIN register is loaded into the ZEROX register (417). This is done by selecting the XIN register, which shift of 0 through the barrel shifter (307), as the BIN input to the adder/subtracter unit, selecting the value '0' as the AIN input to the adder/subtracter unit, selecting the add operation for the adder/subtracter unit, and enabling the LD_A6 control input of A6REG to load the output of the adder/subtracter into A6REG, which is mapped as the ZEROX variable in MDC (see FIG. 4). If sampcnt=2, the XIN and ZEROX variables are added, divided by 2, and the result stored back into ZEROX (419) to get the average level of a zero crossing which is expected to be during the time between the sampcnt=3 and sampcnt=2 samples. The resulting ZEROX value is used later on in the algorithm to calculate timing adjustment.

The operation (419) is implemented in the preferred embodiment by the following steps:

1) Select XIN, with shift of 0 through the shifter (307), as the BIN input of the adder/subtracter unit, select A6REG (ZEROX) as the AIN input of the adder/subtracter unit, select the add operation for the adder/subtracter, and enable the LD_TMP control input of TMPREG to load the result (output) of the adder/subtracter into TMPREG (TMPREG=ZEROX+XIN).

2) Select the value '0' as the AIN input of the adder/subtracter, select the TMPREG, with shift of 1 through the shifter (307) to perform a divide by 2, as the BIN input of the adder/subtracter, select the add operation for the adder/subtracter, and enable the LD_A6 control input of A6REG (ZEROX) to load the result (output) of the adder/subtracter into A6REG (ZEROX=TMPREG/2).

On the falling edges of SAMPCLK (411), if sampcnt equals 0, it means that the current sample is expected to be at the center of the symbol and the following series of calculations are performed (421).

1) Set TCNT=20, which is the normal number of A/D clock cycles per SAMPCLK period. This value is adjusted to 19 or 21 when the demodulator has yet to achieve timing synchronization, depending on whether it is leading or lagging in phase. In the preferred embodiment, loading of TCNT is implemented by enabling LD_TCNT (P/O 210) and setting TCNTVAL=20.

2) Save the previous HARDEC[0] (hard decision) value into PREVHARDEC (333). PREVHARDEC and HARDEC [0] are used to determine if there was a change in bit which indicates a zero-crossing.

3) Perform a hard decision and store the new value in HARDEC[0] (427). The hard decision is '1' if the XIN value is greater than or equal to DCAVG (average DC offset level) and '0' if the XIN value is less than DCAVG (A4REG). In the preferred embodiment, the hard decision operation is implemented by the following steps:

a. Select A4REG (DCAVG) as the AIN input of the adder/subtracter, select XIN, with a shift of 0 through the shifter (307), as the BIN input of the adder/subtracter, select the subtract operation for the adder/subtracter, and enable the LD_TMP control input of TMPREG to load the result (output) of the adder/subtracter into TMPREG.

b. Check the TMP_SIGN (215) output. If TMP_SIGN=1, it indicates that XIN≧DCAVG and enable LD_HARDEC with HARDECVAL input equal to 1 to load 1 into the hard decision latch (331); otherwise, enable LD_HARDEC with HARDECVAL input equal to 0 to load 0 into the hard decision latch (331).

4) Determine if there was a zero crossing by comparing HARDEC[0] and PREVHARDEC (429). In the preferred embodiment, this comparison is performed by an exclusive-OR gate (335) with output ZXING (P/O 215) which goes to the state machine. If they are equal, then there was no zero crossing. If they are not equal, then a zero crossing occurred and if HARDEC[0]=1, a positive zero crossing occurred and POSZEROX (A5REG, P/O 313) is updated with ZEROX; otherwise, a negative zero crossing occurred and NEGZEROX (B1REG, 317) is updated with ZEROX. The implementation in the preferred embodiment is similar to the above for transferring from one register to another.

5) Calculate the timing error TIMERROR according to the equation in (431). The implementation in the preferred embodiment is similar to the calculation for SIGAVG (413) described above.

6) Check the TIMERROR value to determine if a timing adjustment needs to be performed (433).

If TIMERROR is greater than a predetermined constant, Tth (P/O of 321), it means that the demodulator's timing is lagging the actual symbol's timing and the following is performed (435):

a. Subtract Tth from TIMERROR.

b. Set TCNT=19 to shorten the A/D clock in order to advance the demodulator's timing to catch up to the actual symbol timing. The implementation in the preferred embodiment is similar to those described above for making a comparison, performing subtraction, and loading the TCNT latch.

If TIMERROR is less than the negative of the predetermined constant, Tth, (437) it means that the demodulator's timing is leading the actual symbol's timing and the following is performed (439):

a. Add Tth to TIMERROR.

b. Set TCNT=21 to lengthen the A/D clock in order to retard the demodulator's timing to fall back to the actual symbol timing. The implementation in the preferred embodiment is similar to those described above for making a comparison, performing subtraction, and loading the TCNT latch.

7) Check HARDEC[0] (P/O 215) to determine whether to update the running average of the "1" or "0" symbol (441). If HARDEC[0]=1, update the ONEAVG (A2REG, P/O 313) variable (443); otherwise, update the ZEROAVG (A3REG, P/O 313) variable (445). The implementation in the preferred embodiment is similar to those described above for making a comparison and calculating a low-pass filter equation.

8) If the demodulator is in Acquire mode (in the preferred embodiment, an input to the state machine not shown in the FIGs), load the DCAVG (A4REG) register with the SIGAVG (A1REG) register (447); otherwise, load DCAVG (A4REG) with the mean (average) of ONEAVG and ZEROAVG (449). The implementation in the preferred embodiment is similar to those described above for loading a register with the value of another register and calculating the mean of two signals (419).

The following pseudo-code fully discloses the demodulation algorithm for RDLAP that the state machine (209) implements when the RDLAP mode is selected at (213). This pseudo-code using the variables as defined describes, functionally, the operation of a hardware embodiment of the state machine (209). This pseudo code or more specifically the functions described by this code are performed by the hardware embodiment for each sampled filtered data at input (204).

RDLAP Variables

XIN-register to hold input sampled data.
PREVXIN-previous XIN value..
SYMERR-symbol error.
AVGSYMERR-running average of symbol error..
SOFTDEC-soft decision value for the symbol.
DCOFFST-running average of the DC offset of the received base band signal.
SYMDIFF-naming average of distance between adjacent symbols.
TIMERROR-running average of timing error.
HARDEC-hard decision.
TCNT-counter to adjust timing of A/D converter.
Kagc-coefficient for SYMDIFF calculation.
Kbtr-coefficient for TIMERROR calculation.
Kdc-coefficient for DCOFFST calculation.
Kchq-coefficient for AVGSYMERR calculation.
Tth-timing error threshold.
SAMPCLK-sample clock = 24 kHz (for RDLAP9.6).
SYMCLK-symbol clock = SAMPCLK/5 = 4800.
sampcnt-sample counter to count 5 SAMPCLKs per SYMCLK.

Pseudo code for RDLAP

```
@ rising edges of SAMPCLK:
    if (sampcnt = 0)
    sampcnt = 4
    else
    sampcnt = sampcnt + 1
    XIN = filter output (204 in FIG. 3).
@ falling edges of SAMPCLK:
    case (sampcnt)
```

```
=1:     PREVXIN = XIN
=0:     begin
        TCNT = 20
        SOFTDEC = XIN – DCOFFST /*Soft decision calculation*/
            /*Hard decision and symbol error calculations*/
        if (SOFTDEC >= 0)
            if (SOFTDEC > SYMDIFF) /*+3 symbol*/
                begin
                HARDEC = 00
                SYMERR = SOFTDEC – (SYMDIFF + SYMDIFF/2)
                end
            else /*+1 symbol*/
                begin
                HARDEC = 01
                SYMERR = SOFTDEC – (SYMDIFF/2)
                end
        else
            if (SOFTDEC < –SYMDIFF) /*–3 symbol*/
                begin
                HARDEC = 10
                SYMERR = SOFTDEC + (SYMDIFF + SYMDIFF/2)
                end
            else
                begin
                HARDEC=11
                SYMERR = SOFTDEC + (SYMDIFF/2)
                end
            /*Timing error update*/
        if (XIN – PREVXIN) > 0)
            TIMERROR = TIMERROR + Kbtr (SYMERR)
        else
            TIMERROR = TIMERROR – Kbtr (SYMERR)
        if (TIMERROR > Tth)
            begin
                TIMERROR = TIMERROR – Tth
                TCNT = 19
            end
            else
            if TIMERROR < –Tth)
                begin
                TIMERROR = TIMERROR + Tth
                TCNT = 21
                end
            /*Update average symbol error*/
            AVGSYMERR = AVGSYMERR – Kchq (AVGSYMERR –
ISYMERRI)
            /*Update SYMDIFF*/
        if (SOFTDEC >= 0)
            SYMDIFF = SYMDIFF + Kagc (SYMERR)
            else
            SYMDIFF = SYMDIFF – Kagc (SYMERR)
            /*Update DCOFFST*/
        DCOFFST = DCOFFST + Kdc(SYMERR)
        end
        endcase
```

The implementation of the RDLAP demodulation algorithm in the preferred embodiment's state machine is similar to that described for the MDC demodulation algorithm and for the sake of simplicity and the avoidance of un-neccessary detail will not be elaborated on here. The state machine (209) generates the appropriate sequence of control signals to the ALU (205) to perform the necessary calculations and comparisons for MDC and RDLAP. All the equations for both MDC and RDLAP can be broken down into steps that the ALU (205) can be controlled to perform. The demodulation algorithms for other protocols can be implemented using the same ALU architecture and adding appropriate control functionality described by pseudo-code for that algorithm to the hardware based embodiment of the state machine(209). This reduces to determining which parameters/variables of the algorithm are mapped to the AIN and BIN inputs (303 and 305) of the adder/subtractor (301) and what coefficients are needed to determine the shifter design.

Thus it will be appreciated by those of ordinary skill in the art that the apparatus and methods disclosed provide a small and power efficient data demodulation logic unit for advantageous use in a radio-frequency data modem. Therefore the instant invention addresses the short comings of the art and is particularly advantageous when used for wireless data communications in a portable environment.

It will be apparent to those skilled in the art that the disclosed invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. A data demodulation logic unit adaptable to multiple data modulation protocols for decoding data, comprising in combination:

an arithmetic logic unit including an input, a plurality of registers and an output controllably operable to convert a base band signal, coupled to said input, to a demodulated data signal representing an estimate of decoded data at said output, a state machine embodied in electronic hardware, coupled to said arithmetic logic unit, said state machine operating in a mode to control said arithmetic logic unit and to select one or more of said plurality of registers for outputting to the output, said mode selectively corresponding to a data modulation protocol and an error correcting circuit coupled to the arithmetic logic unit for receiving the estimate of the decoded data from at least the one or more selected registers.

2. The data demodulation logic unit of claim 1 wherein said arithmetic logic unit further includes an adder subtractor.

3. The data demodulation logic unit of claim 2 wherein said arithmetic logic unit further includes a first plurality of registers.

4. The data demodulation logic unit of claim 3 wherein said arithmetic logic unit further includes a second plurality of registers.

5. The data demodulation logic unit of claim 4 wherein said arithmetic logic unit further includes a shift register selectively coupled to said second plurality of registers.

6. The data demodulation logic unit of claim 5 wherein said state machine is embodied in an integrated circuit.

7. The data demodulation logic unit of claim 1 wherein said state machine and said arithmetic logic unit are embodied in an integrated circuit.

8. A data receiver having the capability of receiving multiple data protocols, comprising in combination:

a receiver arranged to receive a radio frequency signal modulated by data and provide a base band signal, an arithmetic logic unit including an input coupled to said base band signal, a plurality of registers and an output, said arithmetic logic unit controllably operable to convert said base band signal to a demodulated data signal representing an estimate of decoded data, a state machine embodied in electronic hardware, coupled to said arithmetic logic unit, said state machine operating in a mode to control said arithmetic logic unit and to select one or more of said plurality of registers for outputting to the output, said mode selectively corresponding to one of said multiple data protocols and an error correcting circuit coupled to the arithmetic logic unit for receiving the estimate of the decoded data from at least the one or more selected registers.

9. The data receiver of claim 8 wherein said arithmetic logic unit further includes an adder subtractor.

10. The data receiver of claim 9 wherein said arithmetic logic unit further includes a first plurality of registers.

11. The data receiver of claim 10 wherein said arithmetic logic unit further includes a second plurality of registers.

12. The data receiver of claim 11 wherein said arithmetic logic unit further includes a shift register selectively coupled to said second plurality of registers.

13. The data receiver of claim 12 wherein said state machine is embodied in an integrated circuit.

14. The data receiver of claim 8 wherein said state machine and said arithmetic logic unit are embodied in an integrated circuit.

15. The data receiver of claim 14 wherein said mode corresponds to a radio data link access procedure protocol.

16. A data demodulation logic unit adaptable to multiple data modulation protocols, comprising in combination:

an adder subtractor, having a first input, a second input, an output, and a control input, for providing an output signal at said output, said output signal representing the result of said adder subtractor adding or subtracting a first signal at said first input and a second signal at said second input;

a first plurality of registers, each having an input, an output, and a control input, said plurality of registers arranged such that the contents of a register can be selectively applied to said first input, a second plurality of registers, each having an input with at least one input coupled to a base band signal, an output, and a control input, said second plurality of registers arranged such that the contents of a register can be selectively applied to said second input, a state machine embodied in electronic hardware, coupled to each said control input of both said first plurality of registers and said second plurality of registers, and coupled to said control input of said adder subtractor, said state machine selectively operable in a plurality of demodulator modes, each demodulator mode corresponding to a data modulation protocol.

* * * * *